United States Patent
Sadaghiani et al.

(10) Patent No.: US 10,623,423 B1
(45) Date of Patent: Apr. 14, 2020

(54) SYSTEMS AND METHODS FOR INTELLIGENTLY IMPLEMENTING A MACHINE LEARNING-BASED DIGITAL THREAT MITIGATION SERVICE

(71) Applicant: Sift Science, Inc., San Francisco, CA (US)

(72) Inventors: Fred Sadaghiani, San Francisco, CA (US); Megan Mann, San Francisco, CA (US); Aleksandr Lopatin, San Francisco, CA (US); Noah Grant, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

(21) Appl. No.: 16/433,934

(22) Filed: Jun. 6, 2019

(51) Int. Cl.
*H04L 29/06* (2006.01)
*G06N 20/00* (2019.01)

(52) U.S. Cl.
CPC ......... *H04L 63/1416* (2013.01); *G06N 20/00* (2019.01); *H04L 63/1433* (2013.01); *H04L 63/1466* (2013.01)

(58) Field of Classification Search
CPC ............. H04L 63/1416; H04L 63/1433; H04L 63/1466; G06N 20/00; G06N 3/00; G06N 3/02–88; G06N 5/00–048; G06N 7/00–08
See application file for complete search history.

(56) References Cited

U.S. PATENT DOCUMENTS

| | | | | |
|---|---|---|---|---|
| 9,081,616 | B2* | 7/2015 | Yengulalp | G06F 9/5038 |
| 9,516,053 | B1* | 12/2016 | Muddu | H04L 63/1408 |
| 9,766,769 | B1* | 9/2017 | Webber | G06F 3/0481 |
| 9,832,216 | B2* | 11/2017 | Kaloroumakis | G06N 7/005 |
| 10,038,731 | B2* | 7/2018 | Pearl | H04L 67/10 |
| 10,270,788 | B2* | 4/2019 | Faigon | H04L 63/1416 |
| 10,503,899 | B2* | 12/2019 | Moore | G06N 20/00 |
| 2006/0242338 | A1* | 10/2006 | Kootstra | H04L 45/00 710/54 |
| 2010/0332535 | A1* | 12/2010 | Weizman | G06F 11/3672 707/770 |
| 2011/0320407 | A1* | 12/2011 | Augustine | G06F 16/2315 707/636 |
| 2015/0379429 | A1* | 12/2015 | Lee | G09B 5/00 706/11 |
| 2017/0048285 | A1* | 2/2017 | Pearl | H04L 65/403 |
| 2017/0374044 | A1* | 12/2017 | Alyubi | H04L 63/0485 |

* cited by examiner

*Primary Examiner* — Linglan E Edwards
(74) *Attorney, Agent, or Firm* — Padowithz Alce

(57) ABSTRACT

Systems and methods include implementing a review queue interface that includes: a review queue comprising a listing of distinct review items; a current state for each of distinct review items; a listing for each review item of the distinct review items of one or more client browsers that are interacting with each review item; identifying client browser activity of the one or more client browsers; computing a computed state for each of distinct review items based on the client browser activity; computing changes to the state of review items based on an assessment of the current state and the computed state for each of distinct review items; and automatically updating a state of one or more of the distinct review items within the review queue interface based on a difference between the current state and the computed state of the one or more of the distinct review items.

16 Claims, 4 Drawing Sheets

Enabling Queue Interface S210

Identifying Client Activity S220

Computing State of Review Items S230

Generating Updates of State Data S240

Pushing State Data of Review Items S250

SYSTEMS AND METHODS FOR INTELLIGENTLY IMPLEMENTING A MACHINE LEARNING-BASED DIGITAL THREAT MITIGATION SERVICE

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enables entities to engage and perform an incalculable amount of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third-parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

SUMMARY OF THE INVENTION

In one embodiment, a machine learning-based service and system for implementing a collisionless queue, the system includes a machine learning-based service that is implemented by a distributed network of computers that: implement a review queue interface that includes: a review queue comprising a listing of a plurality of distinct review items; a current state for each of the plurality of distinct review items; a listing for each review item of the plurality of distinct review items of one or more client browsers that are interacting with each review item; identifies client browser activity of the one or more client browsers; computes a computed state for each of the plurality of distinct review items based at least on the client browser activity; computes changes to the state for one or more of the plurality of review items based on an assessment of the current state and the computed state for each of the plurality of distinct review items; and automatically updates a state of one or more of the plurality of distinct review items within the review queue interface based on a difference between the current state and the computed state of the one or more of the plurality of distinct review items.

In one embodiment, a review item relates to an item comprising one or more of digital activity data and digital transaction data sourced from an automated decisioning workflow of the machine learning-based service without a disposal decision.

In one embodiment, the machine learning-based service automatically pushes a notification to any one of the one or more client browsers interacting with a review item with the state change based on the difference between the current state and the computed state of the one or more of the plurality of distinct review items.

In one embodiment, the current state or the computed state for a given review item of the plurality of review items includes one or more of: [1] unclaimed state; [2] claimed state; [3] decided state; and [4] expired state.

In one embodiment, a review item having a claimed state relates to a review item in a review queue that is being viewed by or via at least one browser according to one or more viewing semantics.

In one embodiment, a review item having an unclaimed state relates to a review item that is not being viewed by or via at least one browser.

In one embodiment, a review item having a decided state relates to a review item having an associated disposal decision or relates to a review item that has been decided on by an analyst associated with a browser.

In one embodiment, a review item having an expired state relates to a review item without a disposition or has not been explicitly decided on and that has passed a maximum amount of time in which the item may be made or shown as available via the review queue interface.

In one embodiment, the machine learning-based service assesses a predetermined expiry associated with each of the plurality of distinct review items; computes changes to the state for one or more of the plurality of review items based on the assessment of the predetermined expiry; and automatically updating the state of one or more of the plurality of distinct review items within the review queue interface based on an expiration of the predetermined expiry of the one or more of the plurality of distinct review items.

In one embodiment, the machine learning service: records within a persistent, append-only log of events client browser activity of the one or more client browsers interacting with the review queue interface; and computing the computed state for each of the plurality of distinct review items is based on a replay of the persistent, append-only log of events.

In one embodiment, the computed state of a review item of the plurality of distinct review items is updated based on a client browser of the one or more client browsers navigating away from the review item.

In one embodiment, the machine learning service: enables an atomic claim operation that, when executed, simultaneously releases a claim by a client browser to a first review item and automatically claims a second unclaimed review item.

In one embodiment, the machine learning service: synchronizes a client browser with other client browsers of the one or more client browsers when a viewing state of the client browser to one or more of the plurality of distinct review items changes.

In one embodiment, the machine learning service: pushes to a client browser of the one or more client browsers the computed state of each of a plurality of distinct review items based on a receipt of a hypertext transfer protocol (HTTP) long-polling request from the client browser.

In one embodiment, the machine learning service: pushes to a client browser of the one or more client browsers the computed state of each of a plurality of distinct review items based on a receipt of a hypertext transfer protocol secure (HTTPS) long-polling request from the client browser.

In one embodiment, a machine learning-based service and method for implementing a collisionless queue, the method includes implementing a machine learning-based service that is implemented by a distributed network of computers; implementing a review queue interface that includes: a review queue comprising a listing of a plurality of distinct review items; a current state for each of the plurality of distinct review items; a listing for each review item of the plurality of distinct review items of one or more client browsers that are interacting with each review item; identifying client browser activity of the one or more client browsers; computing a computed state for each of the plurality of distinct review items based at least on the client browser activity; computing changes to the state for one or more of the plurality of review items based on an assessment of the current state and the computed state for each of the plurality of distinct review items; and automatically updating a state of one or more of the plurality of distinct review items within the review queue interface based on a difference between the current state and the computed state of the one or more of the plurality of distinct review items.

In one embodiment, a review item relates to an item comprising one or more of digital activity data and digital transaction data sourced from an automated decisioning workflow of the machine learning-based service without a disposal decision.

In one embodiment, the method includes reviewing within a persistent, append-only log of events client browser activity of the one or more client browsers interacting with the review queue interface; and computing the computed state for each of the plurality of distinct review items is based on an assessment of the persistent, append-only log of events.

BRIEF DESCRIPTION OF THE FIGURES

FIG. 2 illustrates an example method in accordance with one or more embodiments of the present application;

DESCRIPTION OF THE PREFERRED EMBODIMENTS

Figure 1:
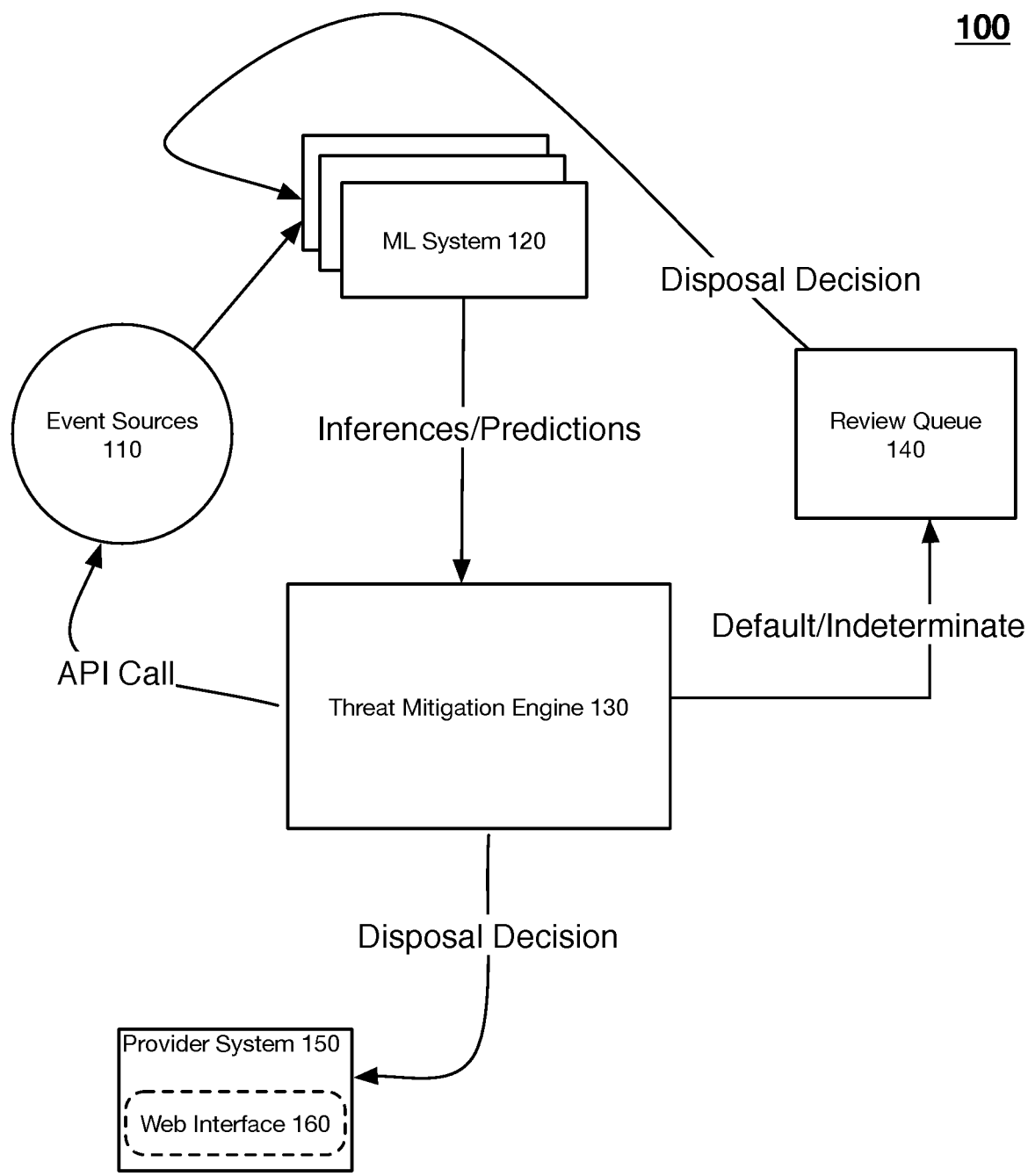
FIG. 1 illustrates a schematic representation of a system in accordance with one or more embodiments of the present application.
Figure 3:
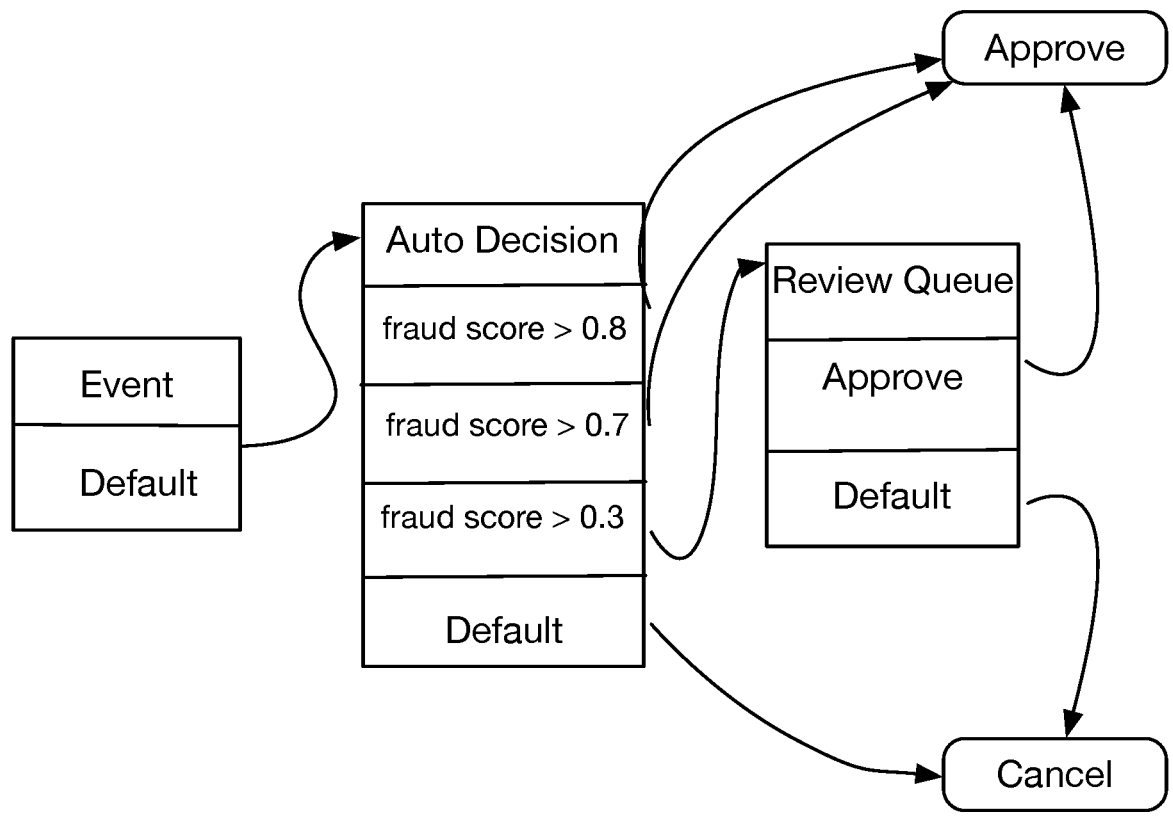
FIG. 3 illustrates an example schematic of a digital threat mitigation platform in accordance with one or more embodiments of the present application.

The following description of the preferred embodiments of the present application are not intended to limit the inventions to these preferred embodiments, but rather to enable any person skilled in the art to make and use these inventions.

1. Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities.

The advanced technology platform of many embodiments of the present application employs a robust ensemble of machine learning models and related systems that operate to ingest the great number of digital activities performed and events occurring over the web. Accordingly, using these finely tuned and perpetually evolving and tunable machine learning models, a system implementing the several embodiments of the present application can predict a threat level and/or classify a digital threat with high accuracy and, in some embodiments, in real-time (e.g., as the event is occurring or shortly thereafter) compute a digital threat score for each event or activity that is received by the system.

The digital threat score may be exposed via a score application program interface (API) that may function to interact with various endpoints of the digital threat mitigation platform. Specifically, the score API may function to interact with one or more computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current the digital events to mitigate or eliminate a digital threat associated therewith.

Additionally, recognizing that in some circumstances service providers that provide online and/or digital resources to users may need to mitigate or prevent multiple forms of digital fraud and/or digital abuse simultaneously, the embodiments of the present application enable the generation of a global digital threat score and a plurality of specific digital threat scores for varying, known digital fraud or abuse types. Accordingly, while the global digital threat score may indicate to the service provider a general indication of the existence of digital fraud and/or digital abuse in digital events data, the specific digital threat scores for the plurality of digital abuse types function to specifically identify a type of fraud or abuse that is being committed in a digital events dataset. These specific indications allow the service provider and/or the digital threat mitigation platform to implement digital threat mitigation or prevention actions that effectively address the specific digital fraud or abuse.

2. Collision-Less Queues Overview

Additionally, as mentioned above, not all digital activity and/or digital events passing through the one or more automated workflows for handling threat scoring requests successfully traverse the automated workflows and obtain an automated decision. In such circumstances, these non-conformant digital activity and/or digital events may pass to a sub-system, such as a reviewing queue, of the machine learning-based service 100 for handling and generating a decision.

The amount of non-conformant activity and/or events may be numerous for certain subscribers to the service 100 and create a number of collisions and/or interferences between analysts and/or client browsers attempting to handle and/or provide a decision for disposing the non-conformant activity and/or events. The collisions within the subsystem of the service 100 may cause duplication in tasks, lost efficiency in handling and/or generating a decision for given transactions, and/or the like.

The present application, however, in one or more embodiments provide systems and methods (technique) that reduces and/or eliminate potential interferences and/or collisions between browsers/analysts attempting to handle given non-conformant transactions entering the reviewing subsystem of the service 100. As described in more detail below, the embodiments of the present application enable a determination of state data for each of the review items within the subsystem, provide real-time updates to each of the subsystem and client browsers interacting with the subsystem such that interferences between distinct browsers and/or analysts are reduced or eliminated altogether.

3. Machine Learning-Based System and Service for Digital Fraud and/or Abuse Detection and Mitigation As shown in FIG. 1, a machine learning-based service and system 100 for detecting digital fraud and/or digital abuse includes one or more digital event data sources 110, a web interface 160, a digital threat mitigation platform 130, and a service provider system 150.

The system 100 functions to enable a prediction of multiple types of digital abuse and/or digital fraud within a single stream of digital event data. The system 100 provides web interface 160 that enables users to generate a request for a global digital threat score and additionally, make a request for specific digital threat scores for varying digital abuse types. After or contemporaneously with receiving a request from the web interface 120, the system 100 may function to collect digital event data from the one or more digital event data sources no. The system 100 using the digital threat mitigation platform 130 functions to generate a global digital threat score and one or more specific digital threat scores for one or more digital abuse types that may exist in the collected digital event data.

The one or more digital event data sources 110 function as sources of digital events data and digital activities data, occurring fully or in part over the Internet, the web, mobile applications, and the like. The one or more digital event data sources no may include a plurality of web servers and/or one or more data repositories associated with a plurality of service providers (e.g., subscribers to the machine learning-based service). Accordingly, the one or more digital event data sources no may also include the service provider system 150.

The one or more digital event data sources no function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, etc.) of the service providers. The digital events data and digital activities data collected by the one or more digital event data sources 110 may function as input data sources for a machine learning system 120 of the digital threat mitigation platform 130.

The digital threat mitigation platform 130 functions as an engine that implement at least a machine learning system 120 and, in some embodiments, together with a warping system to generate a global threat score and one or more specific digital threat scores for one or more digital abuse types. The digital threat mitigation platform 130 functions to interact with the web interface 160 to receive instructions and/or a digital request for predicting likelihoods of digital fraud and/or digital abuse within a provided dataset. The digital threat mitigation engine 130 (or the entirety of the system/service 100) may be implemented via one or more specifically configured web or private computing servers (or a distributed networked computing system) or any suitable system for implementing system 100 and/or method 200.

The machine learning system 120 functions to identify or classify features of the collected digital events data and digital activity data received from the one or more digital event data sources 110. The machine learning system 120 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data and namely, to classify or detect features that may indicate a possibility of fraud and/or abuse. The machine learning system 120 may additionally utilize the input from the one or more digital event data sources 110 and various other data sources (e.g., outputs of system 100, system 100 derived knowledge data, external entity-maintained data, etc.) to continuously improve or accurately tune weightings associated with features of the one or more of the machine learning models defining the ensembles.

The warping system of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system may function to implement a plurality of secondary machine learning models defining a second ensemble that may be used to selectively determine or generate specific digital threat scores. Accordingly, the warping system may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 120. For instance, the machine learning system 120 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating endpoint health intelligence and/or other data relevant to the system 100.

The service provider 150 functions to provide digital events data to the one or more digital event data processing components of the system 100. Preferably, the service provider 150 provides digital events data to an events application program interface (API) associated with the digital threat mitigation platform 130. The service provider 150 may be any entity or organization having a digital or online presence that enable users of the digital resources associated with the service provider's online presence to perform transactions, exchanges of data, perform one or more digital activities, and the like.

Accordingly, outputs of the digital threat mitigation engine 130 and review queue engine 150 (as described in more detail below) may be routed to the machine learning system 120 for improving of the digital fraud and/or digital abuse detection capabilities thereof.

In one aspect of the digital threat mitigation engine 130, a reviewing queue engine 150 may be implemented in combination with the digital threat mitigation engine 130. The reviewing queue engine 140 may preferably be implemented in the circumstances in which an automated disposition for a digital triggering event may be undiscernible (e.g., a triggering digital event does not match or satisfy evaluation flow parameters of the automated decisioning node or the like) by the automated decisioning node (or similar decisioning node of the digital threat mitigation engine 130 or discernible with very low confidence (e.g., confidence being below a minimum confidence threshold) by the digital threat mitigation engine 130 using a digital threat mitigation flow. In such cases, the digital threat mitigation engine 130 may cease processing the triggering digital event according to the digital threat mitigation flow and as a default, flag the digital event as requiring additional scrutiny or review and transmit the triggering digital event to the reviewing queue engine 150.

In some embodiments, the reviewing queue engine 150 functions to discern the triggering digital events deemed undiscernible by preceding nodes of the digital threat mitigation engine 130. Additionally, or alternatively, the reviewing queue engine 150 may function to discern and provide a disposal decision for any digital event data or triggering digital event that was processed through a default node of a preceding node; meaning that the preceding node may not have been able to provide a disposal decision for the digital event data. The reviewing queue engine 150 additionally functions to arrange the received triggering digital events according to a priority (e.g., according to highest probability of fraud, based on time of receipt or occurrence, or according to greatest potential loss due to fraud, and the like). The reviewing queue engine 150 may be implemented semi-automatically using a combination of manual and automated reviewing protocols implemented by a computing node (e.g., a computing server, computing processor, etc.) that may function to apply predetermined review rules, heuristics, or judgements for undiscernible digital events. The manual review component of the reviewing queue engine 150 may include one or more human analyst or digital fraud experts that may assist in discerning the digital event by providing review input regarding a perceived fraudulent nature of the digital event. For instance, the human analyst may produce a threat score or fraud score for a perceived level of payment abuse for the digital event. The analyst review input may additionally include an enumeration of factors and possible weightings for each of the factors contributing to the analyst's reviewing input (e.g., payment abuse scoring or digital actor scoring).

Additionally, or alternatively, the reviewing queue engine 150 may include one or more sub-nodes, which may include a default sub-node. Thus, the review of the digital event either by a computing server and/or the human analyst may be set to follow an ordered progression of the one or more sub-nodes of the reviewing queue engine 150 such that if a disposal decision cannot be made for the digital event data at a predicate or intermediate sub-node of the reviewing queue engine 150, the default sub-node may be automatically executed by the reviewing queue engine 150 to produce a disposal decision for the digital event data.

The disposal decision generated at the reviewing engine queue 150 together with the review input may, in turn, be converted by the system 100 to useable machine learning input into the machine learning digital fraud detection system 120. Thus, the reviewing queue input and disposal decision may be consumed by the machine learning digital fraud detection system 120 as machine learning training data that may be used to adjust weightings of one or more factors of or add new factors (features) with weightings to the existing machine learning models implemented by the machine learning digital fraud detection system 120 thereby improving the technical capabilities of the machine learning digital fraud detection system 120 to evaluate and determine a digital threat level (e.g., digital threat score) associated with digital event data. Additionally, or alternatively, the reviewing input and disposal decision may be consumed by the machine learning digital fraud detection system 120 or generally, by the system 100 to generate one or more new machine learning models incorporating the weightings and/ or factors from the reviewing input. The system 100 may function to augment the existing machine learning models implemented by the machine learning digital fraud detection system 120 with the one or more new machine learning models. Converting the disposal decisioning and reviewing input in this way to form machine learning input effectively evolves the fraud detection and technical operability of the underlying computers implementing the machine learning models. In particular, the system 100 implementing the machine learning models would function to identify fraudulent digital activity with faster and with greater accuracy (e.g., better/improved classifications or predictions of fraud).

The service provider 150 may include one or more web or private computing servers and/or web or private computing devices. Preferably, the service provider 150 includes one or more client devices functioning to operate the web interface 160 to interact with and/or communication with the digital threat mitigation engine 130.

The web interface 160 functions to enable a client system or client device to operably interact with the remote digital threat mitigation platform 130 of the present application. The web interface 160 may include any suitable graphical frontend that can be accessed via a web browser using a computing device. The web interface 160 may function to provide an interface to provide requests to be used as inputs into the digital threat mitigation platform 130 for generating global digital threat scores and additionally, specific digital threat scores for one or more digital abuse types. In some embodiments, the web interface 160 includes an application program interface that is in operable communication with one or more of the computing servers or computing components of the digital threat mitigation platform 130.

The web interface 160 may be used by an entity or service provider to make any suitable request including requests to generate global digital threat scores and specific digital threat scores.

Additionally, as shown in FIG. 2-FIG. 6, the systems and methods described herein may implement the digital threat mitigation platform in accordance with the one or more embodiments described in the present application as well as in the one or more embodiments described in U.S. Pat. No. 9,954,879, which is incorporated by reference in its entirety.

3.1 Review Queue Interface

Figure 4:
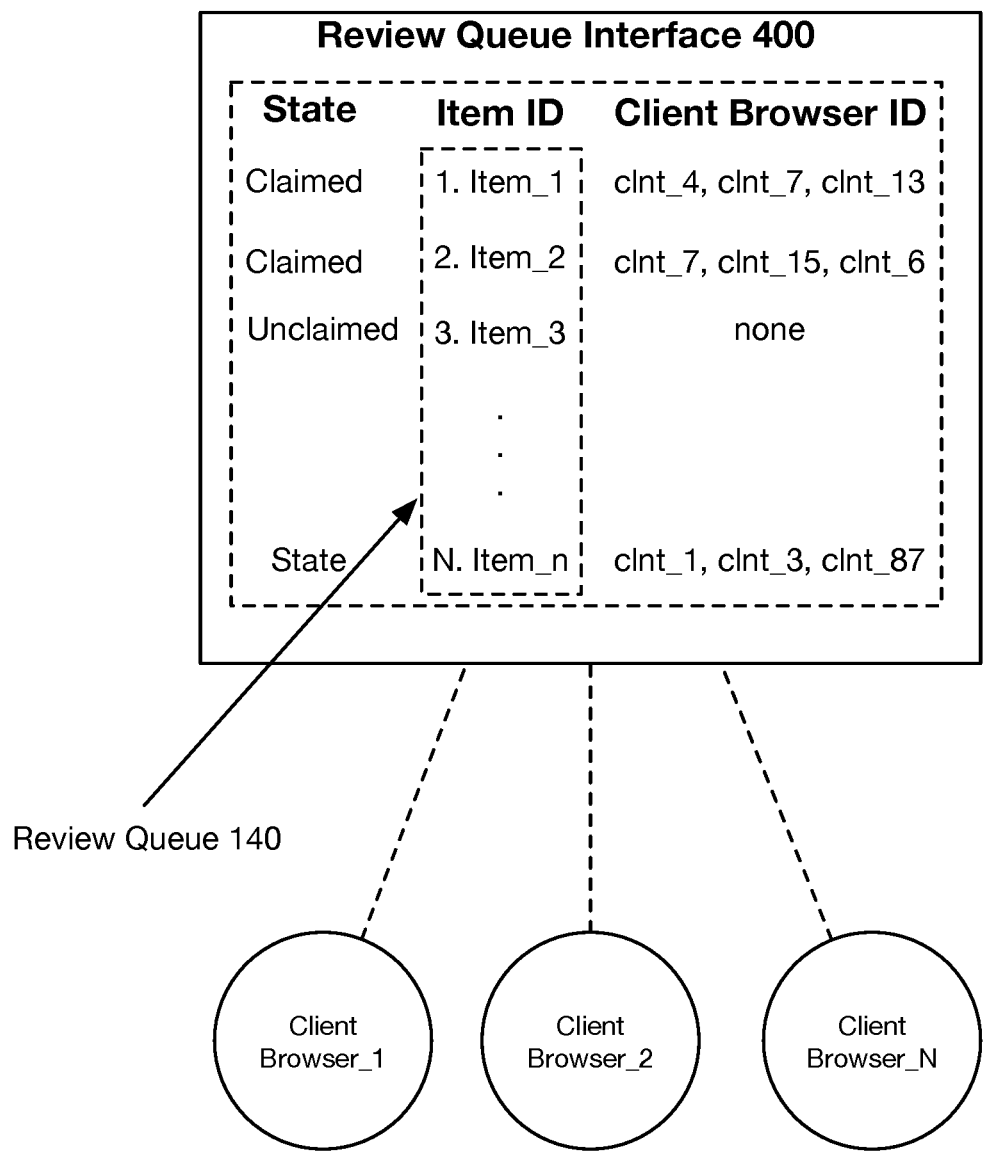
FIG. 4 illustrates an example schematic of an interface for interacting with review items of a digital threat and digital fraud mitigation service in accordance with one or more embodiments of the present application.

Additionally, the machine learning-based service and system 100 may additionally include a review queue interface 400, as shown by way of example in FIG. 4. Referring to FIG. 4, the review queue interface e400 preferably includes, at least, the review queue 150 that includes a listing of all review items and associated identifiers. Additionally, or alternatively, the review queue interface may include a state for each of the listed review items and a listing of the client browsers that are currently viewing and/or interacting with a given review item in the list.

4. Method for Implementing a Collisionless Queue

As shown in FIG. 2, the method 200 includes enabling a review queue interface S210, identifying client activity S220, computing or identifying state data of items in the review queue S230, includes identifying and providing updates of state data to the review queue interface S240, and identifying and providing updates of state data to a client (browser) S250.

The method 200 preferably functions to prevent collisions or interferences between multiple distinct browsers in claiming a review item. That is, the method 200 enables real-time claim status updates, browser notifications, and claim disabling operations relating to the one or more review items in a review queue. In this way, browser interacting with a review queue interface are able to assess a claim availability of each of a plurality of review items and not collide with browsers having an existing claim to one or more of the plurality of review items.

4.1 Enabling a Review Queue

S210, which includes enabling a review queue interface, may function to construct and/or provide a review queue interface that identifies and/or includes review queue items. The review queue interface preferably includes a computer-generated interface that is accessible via a client. The client may be any suitable client, including a client application, a client browser, client computer, and/or the like. In a preferred embodiment, S210 enables an access of the review queue interface by a plurality of client browsers associated with a plurality of distinct users (e.g., analysts) and/or browser accounts.

A review queue item preferably includes data relating to a transaction and/or a composition of digital activity (or digital event) associated with one or more services provided by a subscribing entity (e.g., an online service provider subscribing to the digital threat mitigation service). In one or more embodiments, a review queue item is typically sourced to the review queue as a result of the review queue item failing to successfully traverse one or more (automated) workflows of the machine learning-based service that automate a decision for disposing the review queue item. For instance, an automated disposal decision via the workflow may include one or more of hold (transaction), cancel, approve, and/or the like; each of which allowing for a definitive disposal of the transactions and/or digital activity out from the service thereby defining an item traversing the automated workflow. In this regard, the review queue item, in some embodiments, relates to a non-conformant item having a disposition that is undeterminable by an automated workflow based on one or more attributes of the review queue item. Accordingly, a combination of a non-automated techniques and automated techniques may be required to generate disposal decision for the review queue item.

The review queue interface preferably includes a listing (e.g., an item queue list) or a detail (such as a manifest, etc.) of each review queue item that is pending in some state in a system (e.g., system 100) or service implementing the method 200. For instance, a pending state of a review queue item may include, but should not be limited to, "decided", "claimed", "unclaimed", "expired", "new unclaimed", "released unclaimed", and/or any suitable designation that identifies a present state of a review queue item in the listing.

Preferably, a state of each respective review queue item of a plurality of review items accessible or viewable via the review queue interface may be arranged or positioned proximate to or adjacent an associated review queue item. In this way, a state of a given review queue item may be reviewed and known based on the arrangement of the state proximate to the given review queue item.

In some embodiments, the item queue list can be filtered by or according to a state of a review queue item. For instance, S210 may function to filter an item queue list to only show "unclaimed" items and/or "unclaimed" items (or oppositely "claimed" items) associated with a specific online service provider or subscriber to the service implementing the method 200 or the like. It shall be noted that an item queue list may be filtered according to any suitable or identifiable attribute of a review queue item.

A "claimed" item as referred to herein preferably relates to a review queue item that is currently (in real-time or near real-time) being viewed by or via at least one browser according to one or more viewing semantics. That is, in such embodiments, one or more details of the review queue item is presented via the browser client or the like. In some embodiments, the terms "claiming" (or claimed) and "viewing" may be used interchangeably to indicate that at least one browser may be inspecting or viewing a given review queue item.

An "unclaimed" item preferably relates to a review queue item that is currently (e.g., in real-time or substantially real-time) is not being viewed by or via at least one browser. Additionally, an "unclaimed" item may relate to a review item that has been release in some manner from a "claimed" state to an "unclaimed" state and thus, made available as an "unclaimed" item via the review queue interface.

An "expired" item preferably relates to a review queue item without a disposition and/or has not been explicitly decided on and further, has passed a maximum amount of time (i.e., timed-out) in which the item may be made or shown as available via the review queue interface. That is, in some embodiments, a review queue item in a queue item list may satisfy or exceed a review queue threshold that designates a maximum allowable time that the review queue item has been configured to remain accessible via the review queue interface. It shall be noted that while a review queue item may be expired based on a time threshold, a review queue item may be considered expired for any suitable reason including, based on a revocation of the review queue item from the review queue and/or the like.

A "decided" item preferably relates to a review queue item having a disposal decision associated therewith and/or relates to a review queue item that has been decided on by a browser and/or analyst associated with a browser.

S210 may additionally, or alternatively include constructing a live (or real-time) listing of the at least one or more browsers and/or analyst associated with each browser that may be actively viewing (claiming) and/or evaluating a given review queue item. That is, for each review queue item that is listed or identified in the list of review queue items, S210 may function to generate a browser/analyst listing identifying the browsers and/or analysts that are actively or that have accessed each review queue item and associate the browser/analyst listing to each review queue item within the review queue interface. In such embodiments, S210 may function to identify a browser and/or analyst in the browser/analyst listing with one or more of a browser identifier (or value), an analyst identifier (or value), an analyst avatar and/or the like.

4.2 Client Activity Monitoring & Recording

S220, which includes identifying client activity, may function to include monitoring and recording browser activity data. In a preferred embodiment, S220 may function to monitor browser activity of each of a plurality of browsers interacting with the review queue interface. Preferably, S220 may function to monitor browser activity including browser actions, browser transactions, and/or the like that affect or otherwise, have a bearing on a recognized state of one or more review queue items and/or that may trigger one or more updates to the review queue interface or the like. This type of browser activity may include browser activity that includes claiming an item, posting a decision on an item, releasing an item, and/or the like. For instance, S220 may function to monitor browser activity that includes a request to view one or more review queue items, which may cause a change in the state of the one or more review queue items from a first recognized state (e.g. unclaimed) to a second recognized state (e.g., claimed).

It shall be noted that while it is preferably to monitor browser activity that affect a state of a review queue item or otherwise, triggers an update to the review queue interface, S220 may function to monitor any type of browser activity whether it is active or passive activity (e.g., an amount of time a review queue item is displayed within a browser or the like).

Additionally, or alternatively, S220 may function to capture or record browser activity data. In a preferred embodiment, S220 may function to record browser activity data to a persistent, append-only log of (browser) events. A technical advantage of such a configuration may include that a state of the review queue interface as well as a state of all review queue items may be kept out of persistent storage which may function to simplify a system implementing the method 200 by reducing memory utilization required for maintaining up-to-date information about the review queue interface and/or about each of the review queue items.

In one preferred embodiment, S220 may function to only capture and record browser activity data to the persistent, append-only log that affect a recognized state of a review queue item and/or that causes an update to the review queue interface. For instance, a browser that accesses and views an unclaimed review queue item may function to cause a change in state (e.g., unclaimed to claimed) of the review queue item and at the same time cause an update to be pushed to the review queue interface that indicates that a particular browser or analyst associated with the browser is viewing or claiming the review queue item.

4.3 Claim State Data Computation

S230, which includes computing or identifying state data of review items within a review queue, may function to compute a state or construct state data of a review item based on one or more of client activity data, data associated with the review item independent of client activity, and a persistent, append-only log of events. In a preferred embodiment, S230 may function to identify a state of a review item based on the persistent, append-only log of events. In such preferred embodiment, the persistent, append-only log of events may include a log of the one or more activities of each of a plurality of browsers interacting with the review queue interface and/or with each of a plurality of review queue items. Additionally, or alternatively, the persistent, append-only log of events may include client-server activity data towards the review queue interface and/or towards one or more of a plurality of review items within the review queue.

Accordingly, S230 may function to access the persistent, append-only log and cause a replay of the log or review of the logged events, which may function to replay the browser activity posted to the log over a most-recent period thereby enabling an identification of a state of each of a plurality of review queue items within the review queue. That is, based on the review of the persistent, append-only log, S230 may function to identify client browser claiming/unclaiming activity towards review items along with other activity data (e.g., client server-side activity) and determine claim state for one or more review items based at least on the data from the persistent, append-only log of events.

Preferably, the persistent, append-only log of events includes only activities that may cause an update to a claim or an update to a state of a review item.

In one embodiment, a state of a review item may be changed or updated based on browser/analyst viewing state. That is, in some embodiments, a state of a review item may be updated or changed to claimed when an analyst operating a browser or the like by navigating towards a review item, opening, and viewing details of the review item. In some embodiments, a state of a review item may be updated or changed to unclaimed when an analyst operating a browser or the like by navigating away from a review item. Navigating away from a review item may constitute an implicit release of a claim by a browser or the like towards one or more review items. In such embodiments, navigating away may including closing a browser window that includes review item data, switching or minimizing windows or screens such that details of the review item are not viewable in one or more windows of a browser, and/or simply failing to interact with a given review item for a predetermined period of time. Thus, in some embodiments, S230 may function to implement a navigating away threshold or an implicit release threshold, such that if the navigating activity of a given browser satisfies the navigating threshold or the implicit threshold, S230 may determine that an implicit release to a claim of a review item is made and correspondingly, function to update a claim state of the review item.

In one embodiment, a state of a review item may be changed or updated based an explicit review item-release. That is, in some embodiments, a browser or analyst operating a browser may expressly indicate or publish that a claim to a given review item is being released by operating one or more release features or providing some input to the review queue interface that enables an express release.

In one embodiment, a state of a review item may be changed or updated based on server-side event. In some embodiments, each of a plurality of review items in a review queue may be associated with an expiry or an expiry condition. In such embodiments, the expiry may be a time-based expiration which includes a predetermined (future) date/time at which a given review item will expire and no longer be available for decisioning thereon. Accordingly, an expired review item includes a review item that has not been explicitly decided on and has passed a maximum allowable amount of time that the review item has been configured to remain within the review queue. In some embodiments, an expiry condition may be dynamic and based on a number of factors including an amount of review items within a review queue and a time/date at which a given review item entered the queue. In such embodiments, a size of the review queue may dictate that older review items be pushed out of the review queue to accommodate newer or more recent in time review items to enter the review queue. It shall be noted that the expiry condition may be any suitable or type of condition that causes an expiration of review items that has not been decided on. In all such embodiments, S230 implementing a client server or the like may function to monitor and identify when an expiry event has occurred and publish an update to a state of a review item.

In one embodiment, a state of a review item may be changed or updated based on disposal decision. Accordingly, in such embodiments, a browser and/or analyst associated with the browser may function post or publish to the service or system implementing the method 200 a decision that causes a definitive disposal of the review item. In such embodiments, in response to identifying or detecting a disposal decision towards a review item, S230 may function to publish an update to a state of the associated review item.

In one embodiment, a state of a review item may be changed or updated based on a revocation of a review item from a review queue. That is, in some embodiments, a client server, an administrator, or the like may function to revoke a review item by disabling an ability to claim and/or review the review item. In such embodiments, S230 may function to publish an update to a state of the associated review item indicating that the review item is disabled or revoked.

In one embodiment, a state of a plurality of review items may be changed or updated based on an atomic claim operation. In a preferred embodiment, an atomic claim operation preferably functions to enable a release of a claim by a client of a first review item and enable an automatic claim by the client to an unclaimed item in the review queue. That is, a single atomic claim operation includes at least two computer-executable instructions that when executed by a computer causes a (or near) simultaneous release of a claim and a making of a claim towards a next or pending review item that is not claimed or being viewed by another browser or analyst. In such embodiments, the simultaneous claiming of the unclaimed review item may be of review item that is at a top of a review queue list or that is next in a prioritized list of review items. That is, 4.4 Review Item (Claim) State Updates S240, which includes identifying and providing updates of state data, may function to identify a change in state data of one or more review items in the review queue and preferably, publish an update to a state of the one or more review items based on the identified change in state data.

In a preferred embodiment, S240 may function to identify a change in state data of the one or more review items based on claim state data (as constructed in S230). In such preferred embodiment, S240 may function to assess an identified current state of each of one or more review items in the review queue to a computed state of each of the one or more review items within the claim state data. Accordingly, if there is a difference or delta between the identified current state (i.e., the viewable or currently published state) of a given review item and a computed state of the given difference (i.e., delta in state), S240 may function to identify a change in state data for the given review item and contemporaneously with or responsive to the determination of the change, publish an update to the state of the given review item.

Preferably, S240 may function to use a computing server or other computer implemented by the service implementing the method 200 to push or publish a new state of the given review item to the review queue interface. Specifically, when there is a delta in the state of a given review item, S240 publishes the computed state of the given review item to review item list of the review queue interface. Additionally, or alternatively, S240 may function to publish the computed state of the given review item directly to each of the one or more client browsers viewing the given review item within the review item list or that is claiming the review item.

Additionally, or alternatively, S240 may function to provide an automatically updating (auto-updating) dataset of browser/analyst claims to one or more review items. In one embodiment, the auto-updating dataset comprises the review item queue list, which may be displayed via the review queue interface when accessed by a browser, and that lists each of a plurality of review items within the review queue together with claim data (i.e., the browser/analyst claims). Accordingly, when there is a difference between a computed state and a currently published state of a review item, S240 may function to automatically update the dataset (e.g., the item queue list) periodically, in real-time, or in near real-time (e.g., within 1 sec. to 5 minutes or more).

4.5 Updates and Browser Notifications

S250, which includes identifying and providing updates of state data to a client (browser), may function to identify a viewing state of a browser/analyst and provide to one or more browsers an update relating to one or more review queue items. For instance, a viewing state change may relate to a viewing via a client browser of a review item to not viewing the review item (e.g., navigating away from the review item, etc.) or from not viewing the review item to viewing the review item (e.g., navigating to or accessing the reviewing item, etc.).

In a preferred embodiment, S240 may function enable a client browser to synchronize with one or more other (distinct) browsers when the client browser's viewing state changes. That is, in circumstances in which a given client browser or the like interacts with a review item in a manner that affects the state or claim status of the review item, S240 may function to automatically synchronize the given client browser with other browsers that may be actively interacting with one or more components (e.g., the review item list, a review item, etc.) of the review queue interface or the like. In such embodiments, a viewing state change of a browser and auto-synchronization to other browsers may include or cause a generation of a notification (or other indication) that includes the update to a claim status or state of a given review item. That is, in the synchronize state, data relating to an operation and/or interaction of a given client browser with a review item may be automatically shared (in real-time or near real-time) with one or more other browsers interacting with the review queue interface. S240 may preferably function to publish the notification each of the other browsers that are synchronized with the browser that caused the change in the viewing state of the given review item.

Additionally, or alternatively, in some embodiments, the notification may enable the synchronized browsers to view and/or claim a given review item when a status of the given review item has changed from claimed to unclaimed. In such embodiments, a claiming or viewing of the unclaimed review item may be achieved by selecting and/or expanding the notification and once expanded or accessed, selecting the review item described within the notification.

It shall be noted that while S240 may preferably trigger the auto-synchronization between the distinct browsers based on a change in viewing state. Any suitable transaction or interaction involving the client browser and a given review item may act as a triggering event or condition that when satisfied causes the synchronization between client browsers and a corresponding update to the synchronized browsers relating to the state change of the given review item.

Additionally, or alternatively, S250 may function to push updates to a browser via hypertext transfer protocol (HTTP) or hypertext transfer protocol secure (HTTPS) long-polling technique. In such embodiments, S250 may function to receive a long-polling request (at a computing endpoint, client-server side, or the like) initiated by a browser for data relating to state data of one or more review items or other information relating to the review queue interface. In response to the request from the browser, S250 may function to block or hold the request until a newer state of one or more review items is available or the request expires (timesout) after a passage of a predetermined time from the receipt of the request (e.g., the passage of 1 to 5 minutes, or the like). Accordingly, once newer state data (e.g., a state change or new state data is available) or the request from the browser expires (which may indicate no newer state data is available), S250 may function to provide to the browser a response to the request and the browser may immediately re-establish a new long polling request to the computing endpoint.

Additionally, or alternatively, S250 may function to publish updates to state data of one or more review items based on a replay of the persistent, append-only log of events. In such embodiments, S250 may function to periodically or continuously replay the persistent, append-only log of events to detect whether any state changes exists. In the case, a state change to one or more review items is detected, S250 may function to automatically publish updates relating to the state changes to the one or more browsers interacting with any interface components of the review queue interface including interacting with the one or more review items.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A machine learning-based system implementing a collisionless queue, the system comprising:
a distributed network of computers, a machine learning-based service being implemented by the distributed network of computers to:
implement a review queue interface that includes a display of:
(i) a review queue comprising a listing of a plurality of distinct review items;
(ii) a current state for each of the plurality of distinct review items, wherein the current state is arranged proximate to each of the plurality of distinct review items; and
(iii) for each review item of the plurality of distinct review items, a listing of distinct browser identifiers for each of one or more client browsers that are interacting with each respective review item;
records to a persistent log of events client browser activity data of the one or more client browsers interacting with the plurality of distinct review items;
computes a computed state for each of the plurality of distinct review items based at least on the client browser activity data, wherein computing the computed state includes:
replaying the persistent log of events;
identifying one or more instances in which the one or more client browsers is viewing one or more of the plurality of distinct review items based on the replay of the persistent log of events;
identifying one or more instances in which the one or more client browsers has viewed away from the one or more of the plurality of distinct review items based on the replay of the persistent log of events;
computes changes to the current state that is displayed for each of the plurality of distinct review items based on an assessment of the current state and the computed state for each of the plurality of distinct review items; and
automatically updates a state of one or more of the plurality of distinct review items within the review queue interface based on identifying a difference between the current state and the computed state of the one or more of the plurality of distinct review items.

2. The system according to claim 1, wherein
a review item relates to an item comprising one or more of digital activity data and digital transaction data sourced from an automated decisioning workflow of the machine learning-based service without a disposal decision.

3. The system according to claim 1, wherein
the machine learning-based service automatically pushes a notification to any one of the one or more client browsers interacting with a review item with the state change based on the difference between the current state and the computed state of the one or more of the plurality of distinct review items.

4. The system according to claim 1, wherein
the current state or the computed state for a given review item of the plurality of review items includes one or more of:
[1] unclaimed state;
[2] claimed state;
[3] decided state; and
[4] expired state.

5. The system according to claim 4, wherein
a review item having a claimed state relates to a review item in a review queue that is being viewed by or via at least one client browser according to one or more viewing semantics.

6. The system according to claim 4, wherein
a review item having an unclaimed state relates to a review item that is not being viewed by or via at least one browser.

7. The system according to claim 4, wherein
a review item having a decided state relates to a review item having an associated disposal decision or relates to a review item that has been decided on by an analyst associated with a browser.

8. The system according to claim 4, wherein
a review item having an expired state relates to a review item without a disposition or has not been explicitly decided on and that has passed a maximum amount of time in which the item may be made or shown as available via the review queue interface.

9. The system according to claim 1, wherein:
the machine learning-based service assesses a predetermined expiry associated with each of the plurality of distinct review items;
computes changes to the state for one or more of the plurality of review items based on the assessment of the predetermined expiry; and
automatically updating the state of one or more of the plurality of distinct review items within the review queue interface based on an expiration of the predetermined expiry of the one or more of the plurality of distinct review items.

10. The system according to claim 1, wherein:
the machine learning service:
records within a persistent log of events client browser activity of the one or more client browsers interacting with the review queue interface; and
computing the computed state for each of the plurality of distinct review items is based on a replay of the persistent log of events.

11. The system according to claim 1, wherein
the computed state of a review item of the plurality of distinct review items is updated based on a client browser of the one or more client browsers navigating away from the review item.

12. The system according to claim 1, wherein:
the machine learning service:
executes an atomic claim operation that, when executed, simultaneously releases a claim by a client browser to a first review item and automatically claims a second unclaimed review item in the review queue interface.

13. The system according to claim 1, wherein:
the machine learning service:
synchronizes a client browser with other client browsers of the one or more client browsers when a viewing state of the client browser to one or more of the plurality of distinct review items changes.

14. The system according to claim 1, wherein:
the machine learning service:
pushes to a client browser of the one or more client browsers the computed state of each of a plurality of distinct review items based on a receipt of a hypertext transfer protocol (HTTP) long-polling request from the client browser.

15. The system according to claim 1, wherein:
the machine learning service:

pushes to a client browser of the one or more client browsers the computed state of each of a plurality of distinct review items based on a receipt of an hypertext transfer protocol secure (HTTPS) long-polling request from the client browser.

16. The system according to claim 1, wherein
a review item relates to an item comprising one or more of digital activity data and digital transaction data sourced from an automated decisioning workflow of the machine learning-based service without a disposal decision.

* * * * *